(12) United States Patent
Dai et al.

(10) Patent No.: US 12,501,177 B2
(45) Date of Patent: Dec. 16, 2025

(54) METHOD AND SYSTEM OF POLARIZATION MICROSCOPY IMAGING

(71) Applicant: DUKE UNIVERSITY, Durham, NC (US)

(72) Inventors: Xiang Dai, Durham, NC (US); Roarke Horstmeyer, Durham, NC (US); Shiqi Xu, Durham, NC (US); Pavan Chandra Konda, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 224 days.

(21) Appl. No.: 18/073,759

(22) Filed: Dec. 2, 2022

(65) Prior Publication Data

US 2023/0179876 A1 Jun. 8, 2023

Related U.S. Application Data

(60) Provisional application No. 63/285,134, filed on Dec. 2, 2021.

(51) Int. Cl.
*H04N 23/00* (2023.01)
*G01N 21/21* (2006.01)
(Continued)

(52) U.S. Cl.
CPC ........... *H04N 23/951* (2023.01); *G01N 21/21* (2013.01); *G02B 21/06* (2013.01); *G02B 21/367* (2013.01); *H04N 23/56* (2023.01); *H04N 23/81* (2023.01)

(58) Field of Classification Search
CPC ...... H04N 23/951; H04N 23/56; H04N 23/81; G01N 21/21; G02B 21/06; G02B 21/367
See application file for complete search history.

(56) References Cited

U.S. PATENT DOCUMENTS

| 9,426,455 B2 | 8/2016 | Horstmeyer et al. |
| 2007/0171427 A1* | 7/2007 | Shiode ................ G03F 7/70566 356/495 |

(Continued)

FOREIGN PATENT DOCUMENTS

| EP | 3106862 A1 | 12/2016 |
| WO | 2016101007 A1 | 6/2016 |
| WO | 2017191009 A3 | 12/2017 |

OTHER PUBLICATIONS

Lee, Kyung Chul, et al., "A Smartphone-Based Fourier Ptychographic Microscope Using the Display Screen for Illumination," ACS Photonics, Apr. 23, 2021, pp. 1307-1315, vol. 8, issue 5.

(Continued)

*Primary Examiner* — Zhihan Zhou
(74) *Attorney, Agent, or Firm* — Talem IP Law, LLP

(57) ABSTRACT

A microscopy system includes a lens, an image sensor, a planar array of light sources, and a first and second polarizing filter. The lens is disposed between the array and the image sensor. The image sensor has a field of view and is positioned to capture an image of a sample in a target area. Each light source provides light from a different direction to the target area. The first polarizing filter and the second polarizing filter are each positioned at a rotation angle. A method of microscopy imaging includes illuminating a sample positioned in a target area of a lens with a light source from an array of light sources, acquiring a set of images by an image sensor of the illuminated sample, and performing a reconstruction algorithm on the set of images to generate a composite high-resolution image over the field of view of the image sensor.

17 Claims, 9 Drawing Sheets

(51) Int. Cl.
| | |
|---|---|
| G02B 21/00 | (2006.01) |
| G02B 21/06 | (2006.01) |
| G02B 21/36 | (2006.01) |
| H04N 23/56 | (2023.01) |
| H04N 23/81 | (2023.01) |
| H04N 23/951 | (2023.01) |

(56) References Cited

U.S. PATENT DOCUMENTS

| | | | | |
|---|---|---|---|---|
| 2012/0038885 | A1* | 2/2012 | Cense | A61B 3/102 356/492 |
| 2015/0036038 | A1* | 2/2015 | Horstmeyer | G02B 21/006 348/360 |
| 2015/0160450 | A1* | 6/2015 | Ou | G02B 21/365 348/80 |
| 2016/0088205 | A1* | 3/2016 | Horstmeyer | H04N 23/95 348/80 |
| 2017/0024908 | A1* | 1/2017 | Bosch | G02B 21/008 |
| 2017/0146788 | A1* | 5/2017 | Waller | G06T 19/20 |
| 2017/0363853 | A1* | 12/2017 | Besley | G06V 20/693 |
| 2018/0156597 | A1* | 6/2018 | Smith | G01B 9/02007 |
| 2019/0146204 | A1* | 5/2019 | Stoppe | G02B 21/084 348/79 |
| 2019/0391382 | A1* | 12/2019 | Chung | G02B 21/367 |
| 2021/0072163 | A1* | 3/2021 | Simkhovich | G01N 21/211 |
| 2024/0094439 | A1* | 3/2024 | Rubin | G02B 27/286 |

OTHER PUBLICATIONS

Yeh, Li-Hao, et al., "Experimental Robustness of Fourier Ptychography Phase Retrieval Algorithms," Optics Express, Dec. 16, 2015, 27 pages, vol. 23, issue 26.

Qian, Jianliang, et al., "Efficient Algorithms for Ptychographic Phase Retrieval," Inverse Problems and Applications, Contemp. Math, Jan. 2014, pp. 261-280, vol. 615.

Rodenburg, J. M., et al., "A Phase Retrieval Algorithm for Shifting Illumination," Applied Physics Letters, Nov. 15, 2004, pp. 4795-4797, vol. 85, issue 20.

Park, Yongkeun, et al., "Quantitative Phase Imaging in Biomedicine," Nature Photonics, Oct. 2018 (accessible Sep. 27, 2018), pp. 578-589, vol. 12, issue 10.

Zhanghao, Karl, et al., "High-Dimensional Super-Resolution Imaging Reveals Heterogeneity and Dynamics of Subcellular Lipid Membranes," Nature Communications, Nov. 18, 2020, 10 pages, vol. 11, issue 1.

Lu, Jin, et al., "Single-Molecule 3D Orientation Imaging Reveals Nanoscale Compositional Heterogeneity in Lipid Membranes," Angewandte Chemie International Edition, Sep. 28, 2020, pp. 17572-17579, vol. 59, issue 40.

Inoue, Shinya, "Polarization Optical Studies of the Mitotic Spindle: I. The Demonstration of Spindle Fibers in Living Cells," Chromosoma, Dec. 1953, pp. 487-500, vol. 5, issue 1.

Spiesz, Ewa M., et al., "A Quantitative Collagen Fibers Orientation Assessment Using Birefringence Measurements: Calibration and Application to Human Osteons," Journal of Structural Biology, Dec. 2011 (accessible Sep. 28, 2011), pp. 302-306, vol. 176, issue 3.

Liu, Tairan, et al., "Deep Learning-Based Holographic Polarization Microscopy," ACS Photonics, Nov. 18, 2020, pp. 3023-3034, vol. 7, issue 11.

Hur, Sunwoong, et al., "Polarization-Sensitive Differential Phase-Contrast Microscopy," Optics Letters, Jan. 14, 2021 (accessible Dec. 22, 2020), 4 pages, vol. 46, issue 2.

De Boer, Johannes F., et al., "Polarization Sensitive Optical Coherence Tomography—a Review [Invited]," Biomedical Optics Express, Mar. 1, 2017, 36 pages, vol. 8, issue 3.

Van Rooij, Jos, et al., "Polarization Contrast Optical Diffraction Tomography," Biomedical Optics Express, Apr. 1, 2020 (accessible Mar. 20, 2020), 13 pages, vol. 11, issue 4.

Chen, Michael, et al., "3D Differential Phase Contrast Microscopy," Biomedical Optics Express, Oct. 1, 2016, 11 pages, vol. 7, issue 10.

Fan, Yao, et al., "Optimal Illumination Scheme for Isotropic Quantitative Differential Phase Contrast Microscopy," Photonics Research, Aug. 1, 2019, 15 pages, vol. 7, issue 8.

Cao, Ruiming, et al., "Self-Calibrated 3D Differential Phase Contrast Microscopy with Optimized Illumination," Biomedical Optics Express, Mar. 1, 2022, 14 pages, vol. 13, issue 3.

Maruyama, Yasushi, et al., "3.2-MP Back-Illuminated Polarization Image Sensor With Four-Directional Air-Gap Wire Grid and 2.5-um Pixels," IEEE Transactions on Electron Devices, Jun. 2018 (accessible May 4, 2018), pp. 2544-2551, vol. 65, issue 6.

Ferrand, Patrick, et al., "Ptychography in Anisotropic Media," Optics Letters, Nov. 15, 2015, 4 pages, vol. 40, issue 22.

Li, Jiaji, et al., "High-Speed in Vitro Intensity Diffraction Tomography," Advanced Photonics, Dec. 28, 2019, 13 pages, vol. 1, issue 06.

Ayoub, Ahmed B., et al., "3D Reconstruction of Weakly Scattering Objects from 2D Intensity-Only Measurements Using the Wolf Transform," Optics Express, Feb. 1, 2021, 7 pages, vol. 29, issue 3.

Streibl, N., "Three-Dimensional Imaging by a Microscope," Journal of the Optical Society of America A, Feb. 1, 1985, 4 pages, vol. 2, issue 2.

Paszke, Adam, et al., "Automatic Differentiation in Pytorch," NIPS 2017 Workshop Autodiff, Oct. 28, 2017.

Kingma, Diederik P., et al., "Adam: A Method for Stochastic Optimization," Jan. 30, 2017 (accessible Dec. 22, 2014), 15 pages, arXiv.

Sultanova, N., et al., "Dispersion Properties of Optical Polymers," Acta Physica Polonica A, Oct. 2009, pp. 585-587, vol. 116, issue 4.

Yakupova, Elmira I., et al., "Congo Red and Amyloids: History and Relationship," Bioscience Reports, Jan. 31, 2019 (accessible Dec. 19, 2018), 22 pages, vol. 39, issue 1.

Yang, Bin, et al., "Polarized Light Microscopy for 3-dimensional Mapping of Collagen Fiber Architecture in Ocular Tissues," Journal of Biophotonics, Aug. 2018, 19 pages, vol. 11, issue 8.

Zhou, Kevin C., et al., "Diffraction Tomography with a Deep Image Prior," Optics Express, Apr. 27, 2020, 25 pages, vol. 28, issue 9.

Boyd, Stephen, et al., "Distributed Optimization and Statistical Learning via the Alternating Direction Method of Multipliers," Foundations and Trends® in Machine Learning, 2010, pp. 1-122, vol. 3, issue 1.

Sun, Yu, et al., "Regularized Fourier Ptychography Using an Online Plug-and-Play Algorithm," ICASSP 2019—2019 IEEE International Conference on Acoustics, Speech and Signal Processing (ICASSP), May 2019 (accessible Nov. 2, 2018), pp. 7665-7669.

Tuchin, Valery V., "Polarized Light Interaction with Tissues," Journal of Biomedical Optics, Apr. 28, 2016, 38 pages, vol. 21, issue 7.

Ou, Xiaoze, et al., "Quantitative Phase Imaging via Fourier Ptychographic Microscopy," Optics Letters, Nov. 15, 2013, 4 pages, vol. 38, issue 22.

Chipman, Russell A., et al., "Polarized Light," Chapter 2, Polarized Light and Optical Systems, Jul. 16, 2018, pp. 31-62, CRC Press.

Wolman, Moshe, "Polarized Light Microscopy as a Tool of Diagnostic Pathology.," Journal of Histochemistry & Cytochemistry, 1975, pp. 21-50, vol. 23, issue 1, SAGE Publications Sage CA: Los Angeles, CA.

Jin, Lee-Way, et al., "Imaging Linear Birefringence and Dichroism in Cerebral Amyloid Pathologies," Proceedings of the National Academy of Sciences, Dec. 23, 2003, pp. 15294-15298, vol. 100, issue 26.

Manjunatha, Bhari Sharanesha, et al., "Histopathological Evaluation of Collagen Fibers Using Picrosirius Red Stain and Polarizing Microscopy in Oral Squamous Cell Carcinoma," Journal of Cancer Research and Therapeutics, 2015, 5 pages, vol. 11, issue 2.

He, Chao, et al., "Characterizing Microstructures of Cancerous Tissues Using Multispectral Transformed Mueller Matrix Polarization Parameters," Biomedical Optics Express, Aug. 1, 2015 (accessible Jul. 17, 2015), pp. 2934-2945, vol. 6, issue 8.

(56) References Cited

OTHER PUBLICATIONS

Zhang, Yibo, et al., "Wide-Field Imaging of Birefringent Synovial Fluid Crystals Using Lens-Free Polarized Microscopy for Gout Diagnosis," Scientific Reports, Jun. 30, 2016, 14 pages, vol. 6, issue 1, article 28793.

Jan, Ning-Jiun, et al., "Polarization Microscopy for Characterizing Fiber Orientation of Ocular Tissues," Biomedical Optics Express, Dec. 1, 2015 (accessible Nov. 5, 2015), pp. 4705-4718, vol. 6, issue 12.

Badreddine, Ali H., et al., "Real-Time Imaging of Action Potentials in Nerves Using Changes in Birefringence," Biomedical Optics Express, May 1, 2016 (accessible Apr. 21, 2016), pp. 1966-1973, vol. 7, issue 5.

He, Chao, et al., "Polarisation Optics for Biomedical and Clinical Applications: A Review," Light: Science Applications, Sep. 22, 2021, pp. 1-20, vol. 10, issue 1, article 194.

Koike-Tani, Maki, et al., "Polarized Light Microscopy in Reproductive and Developmental Biology," Molecular Reproduction and Development, Jul. 2015 (accessible Aug. 26, 2013), pp. 548-562, vol. 82, issue 7-8.

Panwar, Neha, et al., "A Review on Influence of Mineralogy and Diagenesis on Spectral Induced Polarization Measurements in Carbonate Rocks," Petro-Physics and Rock Physics of Carbonate Reservoirs, 2020 (accessible Oct. 17, 2019), pp. 115-125, Springer Singapore.

Guo, Syuan-Ming, et al., "Revealing Architectural Order with Quantitative Label-Free Imaging and Deep Learning," eLife, Jul. 27, 2020, pp. 1-33, vol. 9, article eLife.55502.

Zheng, Guoan, et al., "Fourier Ptychographic Microscopy: A Gigapixel Superscope for Biomedicine," Optics and Photonics News, Apr. 1, 2014, pp. 26-33, vol. 25, issue 4.

Jan, Ning-Jiun, et al., "Collagen Architecture of the Posterior Pole: High-Resolution Wide Field of View Visualization and Analysis Using Polarized Light Microscopy," Investigative Opthalmology & Visual Science, Feb. 3, 2017, pp. 735-744, vol. 58, issue 2.

Zheng, Guoan, et al., "Wide-Field, High-Resolution Fourier Ptychographic Microscopy," Nature Photonics, Sep. 28, 2013, 16 pages, vol. 7, issue 9.

Pezzaniti, J. Larry, et al., "Mueller Matrix Imaging Polarimetry," Optical Engineering, Jun. 1, 1995, p. 1558-68 vol. 34, issue 6.

Hielscher, Andreas, et al., "Diffuse Backscattering Mueller Matrices of Highly Scattering Media," Optics Express, Dec. 22, 1997, pp. 441-453, vol. 1, issue 13.

Yao, Gang, et al., "Two-Dimensional Depth-Resolved Mueller Matrix Characterization of Biological Tissue by Optical Coherence Tomography," Optics Letters, Apr. 15, 1999, pp. 537-539, vol. 24, issue 8.

Jones, R. Clark, "A New Calculus for the Treatment of Optical Systemsl Description and Discussion of the Calculus," Journal of the Optical Society of America, Jul. 1, 1941, pp. 488-493, vol. 31, issue 7.

Wang, Zhuo, et al., "Jones Phase Microscopy of Transparent and Anisotropic Samples," Optics Letters, Jun. 1, 2008 (accessible May 30, 2008), pp. 1270-1272, vol. 33, issue 11.

Aknoun, Sherazade, et al., "Quantitative Retardance Imaging by Means of Quadri-Wave Lateral Shearing Interferometry for Label-Free Fiber Imaging in Tissues," Optics Communications, Sep. 1, 2018, pp. 17-27, vol. 422.

Jiao, Yuheng, et al., "Real-Time Jones Phase Microscopy for Studying Transparent and Birefringent Specimens," Optics Express, Nov. 9, 2020 (accessible Oct. 27, 2020), pp. 34190-34200, vol. 28, issue 23.

Saba, Amirhossein, et al., "Polarization-Sensitive Optical Diffraction Tomography," Optica, Mar. 12, 2021, pp. 402-408, vol. 8, issue 3.

Colomb, Tristan, et al., "Polarization Imaging by Use of Digital Holography," Applied Optics, Jan. 1, 2002, pp. 27-37, vol. 41, issue 1.

Kim, Youngchan, et al., "Polarization Holographic Microscopy for Extracting Spatio-Temporally Resolved Jones Matrix," Optics Express, Apr. 23, 2012, pp. 9948-9955, vol. 20, issue 9.

Yang, Taeseok Daniel, et al., "Single-Shot Digital Holographic Microscopy for Quantifying a Spatially-Resolved Jones Matrix of Biological Specimens," Optics Express, Dec. 12, 2016, pp. 29302-29311, vol. 24, issue 25.

Ge, Baoliang, et al., "Single-Shot Quantitative Polarization Imaging of Complex Birefringent Structure Dynamics," Jun. 11, 2021, arXiv.

De Boer, Johannes F., et al., "Polarization Sensitive Optical Coherence Tomography—a Review [Invited]," Biomedical Optics Express, Mar. 1, 2017, pp. 1838-1873, vol. 8, issue 3.

Massoumian, F., et al., "Quantitative Polarized Light Microscopy," Journal of Microscopy, Jan. 2003, pp. 13-22, vol. 209, issue 1.

Oldenbourg, Rudolf, "Polarized Light Microscopy: Principles and Practice," Cold Spring Harbor Protocols, Nov. 2013, pp. 1023-1036, vol. 2013, issue 11.

Mehta, Shalin B., et al., "Polarized Light Imaging of Birefringence and Diattenuation at High Resolution and High Sensitivity," Journal of Optics, Sep. 1, 2013, 22 pages, vol. 15, issue 9.

Shin, Seungwoo, et al., "Reference-Free Polarization-Sensitive Quantitative Phase Imaging Using Single-Point Optical Phase Conjugation," Optics Express, Oct. 15, 2018 (accessible Oct. 1, 2018), pp. 26858-26865, vol. 26, issue 21.

Bai, Bijie, et al., "Pathological Crystal Imaging with Single-shot Computational Polarized Light Microscopy," Journal of Biophotonics, Jan. 2020, 13 pages, vol. 13, issue 1.

Song, Seungri, et al., "Large-Area, High-Resolution Birefringence Imaging with Polarization-Sensitive Fourier Ptychographic Microscopy," ACS Photonics, Jan. 20, 2021 (accessible Jan. 7, 2021), pp. 158-165, vol. 8, issue 1.

Song, Qinghua, et al., "Ptychography Retrieval of Fully Polarized Holograms from Geometric-Phase Metasurfaces," Nature Communications, May 27, 2020, 8 pages, vol. 11, issue 1, article 2651.

Yeh, Li-Hao, et al., "uPTI: Uniaxial Permittivity Tensor Imaging of Intrinsic Density and Anisotropy," Sep. 12, 2021 (accessible: Dec. 16, 2020), 52 pages, bioRxiv.

Ferrand, Patrick, et al., "Quantitative Imaging of Anisotropic Material Properties with Vectorial Ptychography," Optics Letters, Feb. 15, 2018 (accessible Dec. 1, 2017), 5 pages, vol. 43, issue 4.

Horstmeyer, Roarke, et al., "A Phase Space Model of Fourier Ptychographic Microscopy," Optics Express, Jan. 13, 2014 (accessible Jan. 2, 2014), p. 338-58, vol. 22, issue 1.

Konda, Pavan Chandra, et al., "Fourier Ptychography: Current Applications and Future Promises," Optics Express, Mar. 30, 2020 (accessible Mar. 19, 2020), pp. 9603-9630, vol. 28, issue 7.

Ou, Xiaoze, et al., "Embedded Pupil Function Recovery for Fourier Ptychographic Microscopy," Optics Express, Mar. 10, 2014 (accessible Feb. 24, 2014), pp. 4960-4972, vol. 22, issue 5.

Tian, Lei, et al., "Multiplexed Coded Illumination for Fourier Ptychography with an LED Array Microscope," Biomedical Optics Express, Jul. 1, 2014 (accessible Jun. 19, 2014), 14 pages, vol. 5, issue 7.

Maiden, Andrew, et al., "Further Improvements to the Ptychographical Iterative Engine," Optica, Jul. 20, 2017 (accessible Jun. 30, 2017), pp. 736-745, vol. 4, issue 7.

Kreutz-Delgado, Ken, "The Complex Gradient Operator and the CR-Calculus," Jun. 25, 2009, 74 pages, arXiv.

Ou, Xiaoze, et al., "High Numerical Aperture Fourier Ptychography: Principle, Implementation and Characterization," Optics Express, Feb. 9, 2015 (accessible Feb. 4, 2015), pp. 3472-3491, vol. 23, issue 3.

Yang, Bin, et al., "Instant Polarized Light Microscopy for Imaging Collagen Microarchitecture and Dynamics," Journal of Biophotonics, Feb. 2021, 20 pages, vol. 14, issue 2.

Oldenbourg, R., "Analysis of Edge Birefringence," Biophysical Journal, Sep. 1991, pp. 629-641, vol. 60, issue 3.

Howie, Alexander J., et al., "Physical Basis of Colors Seen in Congo Red-Stained Amyloid in Polarized Light," Laboratory Investigation, Mar. 2008 (accessible Dec. 31, 2007), pp. 232-242, vol. 88, issue 3.

Mcguire, James P. Jr., et al., "Polarization Aberrations. I. Rotationally Symmetric Optical Systems," Applied Optics, May 21, 1990, 20 pages.

(56) References Cited

OTHER PUBLICATIONS

Loetgering, Lars, et al., "Tailoring Spatial Entropy in Extreme Ultraviolet Focused Beams for Multispectral Ptychography," Optica, Feb. 20, 2021 (accessible Jan. 25, 2021), pp. 130-138, vol. 8, issue 2.

Konda, Pavan Chandra, et al., "Multi-Aperture Fourier Ptychographic Microscopy, Theory and Validation," Optics and Lasers in Engineering, Mar. 2021, 15 pages, vol. 138.

\* cited by examiner

METHOD AND SYSTEM OF POLARIZATION MICROSCOPY IMAGING

CROSS-REFERENCE TO RELATED APPLICATIONS

This application claims the benefit of U.S. Provisional Application Ser. No. 63/285,134, filed on Dec. 2, 2021.

BACKGROUND

Polarization imaging methods provide a useful means to access information about the molecular arrangement of anisotropic samples, with applications spanning pathology, developmental biology, and mineralogy. As such, polarization is an important and exciting intrinsic contrast mechanism in microscopy, especially in combination with phase contrast and fluorescence imaging approaches.

However, polarimetric imaging over wide areas at high resolution remains an outstanding challenge. Current microscopes that image at micrometer-level detail can observe a field-of-view (FOV) that covers several square millimeters, which makes polarimetric imaging of large specimens difficult. To overcome this challenge, most existing approaches scan in a step-and-repeat fashion to create large-area image composites. As a fully quantitative polarimetric recording typically requires multiple snapshots per measurement, this scanning process can be tedious and time-consuming. Further, it is also challenging to obtain phase-sensitive polarimetric measurements (e.g., retardance) with relatively simple microscope hardware, to step-and-scan while maintaining accurate phase sensitivity, and to minimize the impact of polarization-dependent properties of the imaging system on the acquired measurements. Hence, there is an ongoing opportunity for improvements to polarization imaging.

BRIEF SUMMARY

A microscopy system includes a lens, an image sensor, a planar array of light sources, a first polarizing filter, and a second polarizing filter. The lens is disposed between the array of light sources and the image sensor. The image sensor has a field of view and is positioned to capture an image of a sample positioned in a target area. Each light source from the planar array of light sources provides light from a different direction to the target area. The first polarizing filter is positioned at a first rotation angle and is disposed between the target area and array of light sources. The second polarizing filter is positioned at a second rotation angle and is disposed by lens and image sensor.

A method of microscopy imaging includes illuminating, by a light source, a sample positioned in a target area of a lens, wherein the light source is one light source in an array of light sources positioned to provide light to the target area, acquiring a set of images by an image sensor of the illuminated sample, the image sensor having a field of view, and performing a reconstruction algorithm on the set of images to generate a composite high resolution image over the field of view of the image sensor.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present disclosure describes microscopy systems, methods, and associated algorithms that use variable-angle illumination to recover the quantitative complex polarimetric properties of a specimen at high resolution in a large field-of-view. The described microscopy imaging method and system provide a composite image having a large field of view (e.g., centimeter-scale areas) at high resolution (e.g., micrometer resolution) using standard low-cost equipment.

In microscopy, searching a large space for fine features is challenging because there is a tradeoff between field of view and resolution. Any technique that increases resolution in a large field of view imaging is preferable because it enables both large field search and highly zoomed focus on regions of interest. Additionally, different imaging techniques are needed for different properties, such as amplitude, phase diattenuation, and birefringence, and any imaging technique that captures more of these properties at once is preferable to techniques that only capture a subset. This is particularly applicable to the life sciences, where target features may be small relative to the search space (requiring both large field of view and high resolution zoom) and where polarization properties are almost always a useful tool for discriminating regions of interest in biological tissue.

Fourier ptychography is a current quantitative microscopy technique that can increase resolution of a large field of view. The presented method utilizes a novel technique, termed vectorial Fourier ptychography (vFP), that extends Fourier ptychography to account for the vectorial nature of light.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Figure 1:
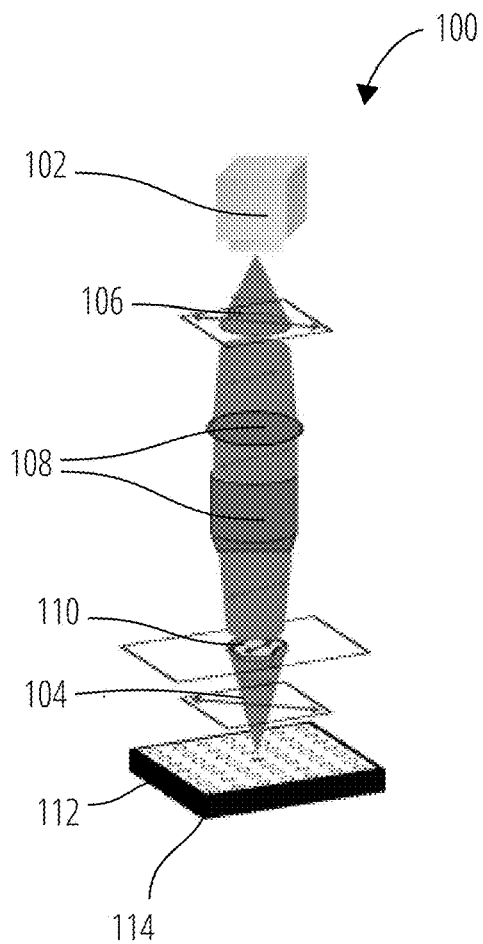
FIG. 1 illustrates a microscopy system with a planar light source array.

FIG. 1 illustrates a microscopy system 100 with a planar array of light sources 112. The microscopy system 100 includes at least one lens 108. The embodiment shown in FIG. 1 illustrates a microscopy system 100 including two lenses 108 which may include an objective lens and a tube lens. However, other lenses used in microscopy may also be used in the microscopy system 100. The array of light sources 112 are positioned in a plane, which in FIG. 1 includes the X-Y plane. The array of light sources 112 includes a plurality of individual light sources 114. Each light source 114 may be an LED light source. In the shown embodiment, the array of light sources 112 includes a 7×7 array of surface mounted light sources 114, however, other array configurations of light sources 114 may be used. The array of light sources 112 may be programmable so that a pattern of illuminating each light source 114 one at a time is possible. An image sensor 102, which may be a digital camera, has a field of view that includes a target area 110. The image sensor 102 is configured to capture an image of the target area 110. The at least one lens 108 is disposed in the light path between the array of light sources and the image sensor 102.

Filters, including a first polarizing filter 104 and a second polarizing filter 106, are positioned on either side of the lens 108 (above and below the lens 108 in the embodiment of FIG. 1). The first polarizing filter 104 is positioned between the target area 110 and the array of light sources 112. The second polarizing filter 106 is positioned between the image sensor 102 and the lens 108. The filters are rotatable filters so that each filter may be rotated with respect to the X-Y plane. After the light is emitted from a light source 114 of the array of light sources 112 and passes through the first polarizing filter 104, the first polarizing filter 104 may act as a generator that polarizes the light. After passing through the lens 108, the emitted light passes through the second polarizing filter 106, where the second polarizing filter 106 may act as an analyzer that analyzes the polarization state of the emitted light before it is captured by the image sensor 102.

A sample, i.e., a specimen, may be positioned in the target area 110 of the lens 108. The specimen may be a biological specimen having a plurality of properties to be measured. In an embodiment, the sample is a thin, essentially, two-dimensional, sample whose length and width are much larger than its depth. For example, the sample may include a width and height around 1 cm and a depth of less than 50 µm with the sample having a single layer.

Figure 2:
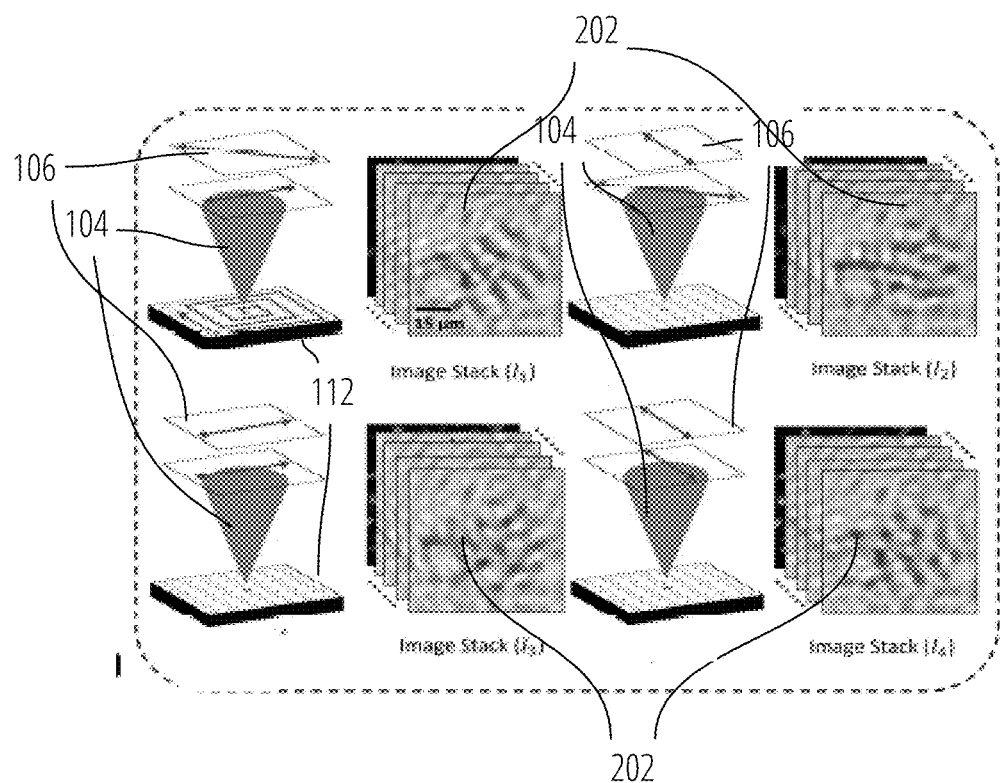
FIG. 2 illustrates example first polarizing filter/second polarizing filter configurations to acquire images for a microscopy imaging method.

FIG. 2 illustrates four different polarizing filter configurations, i.e., first polarizing filter 104 and second polarizing filter 106, that can each provide a set of images 202 taken sequentially to be utilized in the described method. Each of the four shown configurations illustrate the first polarizing filter 104 and second polarizing filter 106 at different rotation angles. For example, in a first configuration in the upper left of FIG. 2, the first polarizing filter 104 is rotated to 90° (shown by arrows in the plane) where the rotation angle of first polarizing filter defines the coordination. For example, if the angle is unknown, it may be defined as 0°. Thus, the configuration of the second polarizing filter 106 is rotated to 45° with respect to the first polarizing filter 104 (shown symbolically by arrows in the plane). There are many different possible configurations of first polarizing filter/second polarizing filter rotation angles that can be utilized in the method. The four polarizing filter configurations shown are merely an example of configurations that may be utilized to acquire sets of images 202 for the proposed method.

The first configuration of polarization filters of FIG. 1 (described above) also illustrates a pattern (shown by an arrow) in which the light sources 114 of the array of light sources 112 may be turned on and off. In other words, each light source 114 of the array of light sources 112 is sequentially illuminated, i.e., turned on and off, in the pattern shown in the first configuration. The pattern is for illustrative purposes as other patterns may be used. When the sample is illuminated by each light source 114 in the array of light sources 112, an image is captured by the image sensor 102. A set of images 202 is produced when the method is repeated for every light source in the array of light sources 112 in the pattern. Likewise, a second set of images 202 may be produced for a second configuration and so on for each of the configurations utilized.

Figure 3:
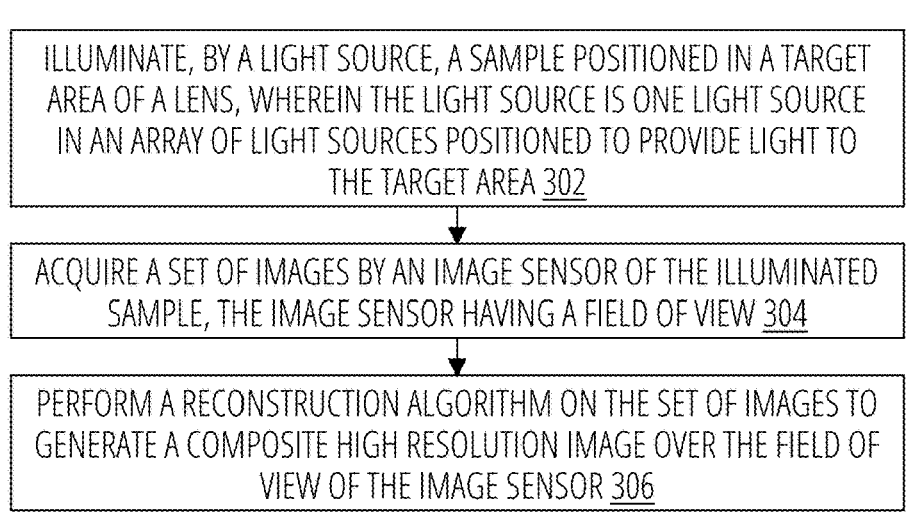
FIG. 3 illustrates a method of polarization microscopy imaging in accordance with one embodiment.

FIG. 3 illustrates a method 300 of polarization microscopy imaging in accordance with one embodiment. In block 302, the method illuminates, by a light source, a sample positioned in a target area of a lens, wherein the light source is one light source in an array of light sources positioned to provide light to the target area. In block 304, the method of polarization microscopy imaging 300 acquires a set of images of an illuminated sample in a target area of a lens by an image sensor with a field of view. The set of images are acquired as described above with reference to FIG. 2. After the set of images 202, or sets of images 202, are acquired, in block 306, the method of polarization microscopy imaging 300 performs a reconstruction algorithm on the set of images to generate a composite high-resolution image over the field of view of the image sensor. The method can then recover complex polarization image properties of the sample.

Figure 4:
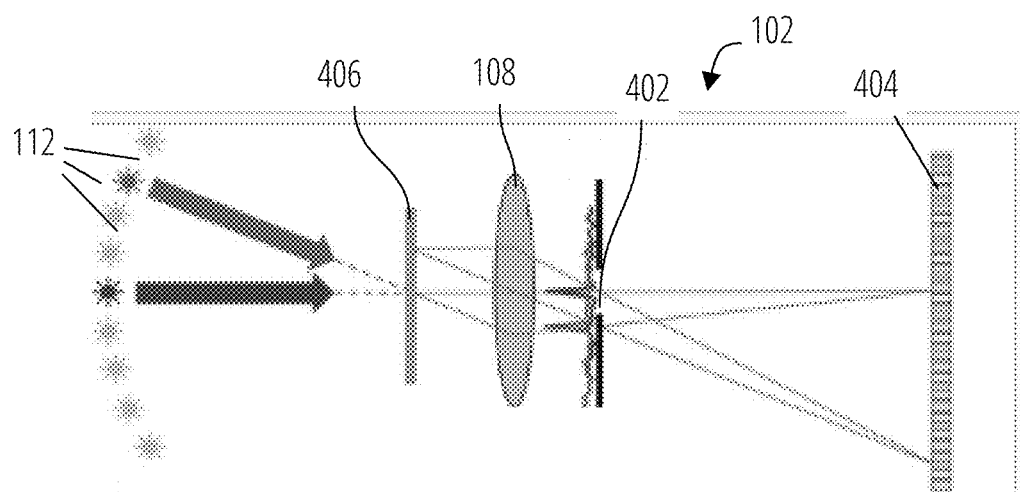
FIG. 4 illustrates an optical configuration to perform the presented method.

FIG. 4 illustrates an optical configuration to perform the presented method. The array of light sources 112 on the left represent sources of tilted illumination that are incident on the sample 406 positioned in a target area at various angles. The light wave travels through the lens 108 to the image sensor 102 via an aperture 402 of a digital camera where the diffraction pattern moves as the illumination is tilted from each of the light sources 114 of the array of light sources 112. The image sensor 102 captures images from the image plane 404.

Prior to utilizing the reconstruction algorithm in presented method, the vectorial optical fields at the image plane and pupil plane may be modeled using Jones calculus. Jones calculus represents the optical field as a complex matrix containing two orthogonal components, defined along the x and y axes. The light's polarization state is defined by the amplitude of these two components at each spatial location of interest.

The polarized light passing through the first polarizing filter and the aberrations of the polarized light may be modeled using Jones calculus to describe the polarization properties of the sample and the polarization aberrations as a sample matrix and a pupil matrix, respectively.

The nth tilted plane wave emitted by a light source 114 from the array of light sources 112 may be described by:

$$\exp(ik_n \cdot r)$$

which is polarized by the first polarizing filter 104 to form a 2×1 vector field, $$G_n^m = [g_x^m \exp(ik_n \cdot r), g_y^m \exp(ik_n \cdot r)]^T$$

The tilted plane wave is obliquely-incident on the sample 406. With the first polarizing filter 104 and the second polarizing filter 106 rotated to specific rotation angles, a first rotation angle and a second rotation angle, respectively, which specifies a particular polarization state, $g_m = [g_x^m, g_y^m]$ is used as complex valued scalers to define the appropriate first polarizing filter 104 weighting for each vector component. The polarized plane wave, $G_n^m$, then interacts with the thin sample 406, which can then be modeled as a 2×2 complex matrix, $\overline{O}(r)$, i.e., the sample matrix.

The resulting optical field then propagates to an aperture 402 of the image sensor 102 where it can be modeled as a 2×2 matrix F that contains the dimensional Fourier transform operator F along its diagonal. Polarization-dependent image aberrations may then be modeled with Jones calculus as a 2×2 complex pupil function, P(k), i.e., the pupil matrix. The pupil function describes how a light wave is affected upon transmission through an optical imaging system such as a camera, microscope, or the human eye. The second matrix can account for both standard aberrations (e.g., defocus, astigmatism) and more complex birefringent effects, for example as introduced by plastic lenses.

Next, the optical field propagates to the image plane 404 which can be modeled by a 2×2 inverse Fourier transform matrix. While the inverse Fourier transform matrix is used for the described calculation, other transform methods may also be used for the modeling. Finally, the optical field passes through the second polarizing filter 106, $A_l$, rotated to a second rotation angle, to produce the nth vector field, $E_n^{(l,m)}$, at the image plane, described by:

$$E_n^{(l,m)} = A_l F^{-1} P(k) F \overline{O}(r) G_n^m$$

where $$\overline{O}(r) = \begin{bmatrix} \overline{O}_{xx}(r) & \overline{O}_{xy}(r) \\ \overline{O}_{yx}(r) & \overline{O}_{yy}(r) \end{bmatrix}, P(k) = \begin{bmatrix} P_{xx}(k) & P_{xy}(k) \\ P_{yx}(k) & P_{yy}(k) \end{bmatrix}.$$

A Fourier shift theorem can be used to remove the first Fourier transform matrix, F, and instead describe a shifted sample spectrum across the pupil plane of the second matrix, caused by each plane wave traveling at angle, $k_n$, as $O(k-k_n)$, where O is the Fourier transform of $\overline{O}$.

A reconstruction algorithm can thus be created for each detected intensity image i under illumination from the nth light source with first polarizing filter and second polarizing filter configurations (l, m) The reconstruction algorithm is described by equation:

$$i_n^{l,m}(O,P) = |a_l^T F^{-1} P(k) O(k-k_n) g_m|^2,$$

where $a_l$ and $g_m$ are the Jones vectors of the $l^{th}$ analyzer, i.e., second polarizing filter, and $g^{th}$ generator, i.e., first polarizing filter. Using linear polarizers for the first polarizing filter and the second polarizing filter, $a_l = [\cos \alpha_l, \sin \alpha_l]^T$ and $g_m = [\cos \gamma_m, \sin \gamma_m]^T$ where $\alpha_l$ and $\gamma_m$ are the rotating angles of the linear polarizers, the second polarizing filter (analyzer) and the first polarizing filter (generator), respectively.

The reconstruction algorithm may be a phase retrieval algorithm to recover the polarization information of the image iteratively at each resolved pixel of each image from a set of images to generate a composite high-resolution image. Form the high-resolution image, a polarization property of the sample may be measured. These quantities may include sample phase, sample retardance, sample orientation, and sample diattenuation.

Figure 5:
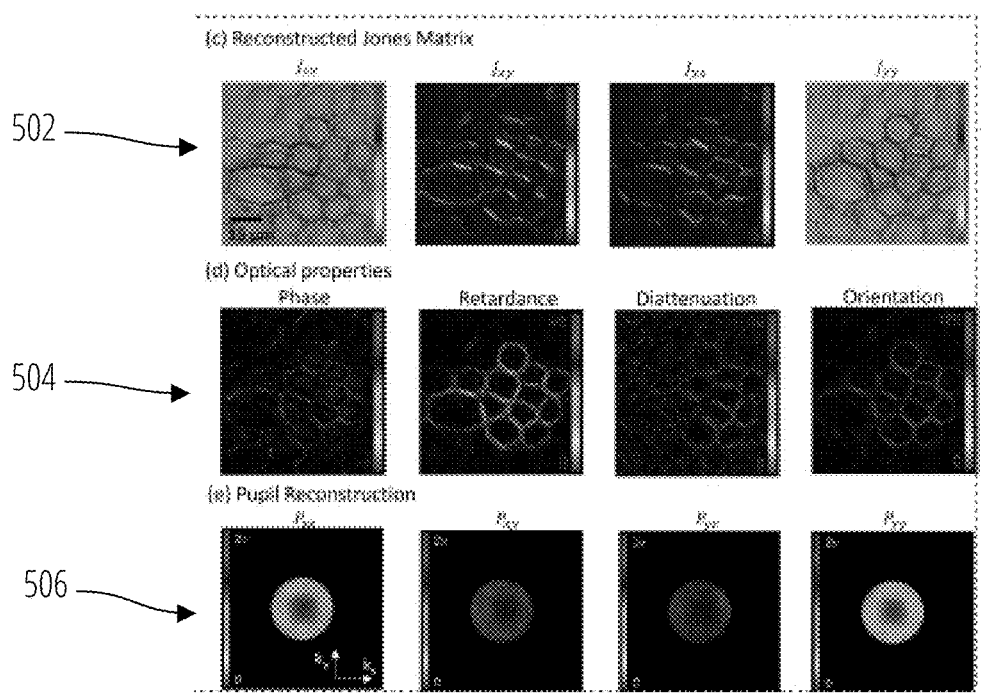
FIG. 5 illustrates a set of generated composite images utilizing a reconstruction algorithm.

FIG. 5 illustrates three rows of images, each row having a set of images. The first row 502 includes a set of composite images generated utilizing the reconstruction algorithm as presented above by acquiring four set of images 202, each set of images 202 using a different set of polarizing filter rotation angles, (i.e., first rotation angle, second rotation angle), for the first polarizing filter 104 and the second polarizing filter 106, respectively. The second row 504 includes a set of images showing sample properties from the set of images shown in the first row 502. The sample properties from the left most image to the right most image of the second row 504 illustrate the properties of phase, retardance, diattenuation, and orientation. These properties may be measured from the set of composite images of first row 502. Lastly, the third row 506 of images in FIG. 5 illustrates a set of images showing polarization function with removed aberrations.

Figure 6:
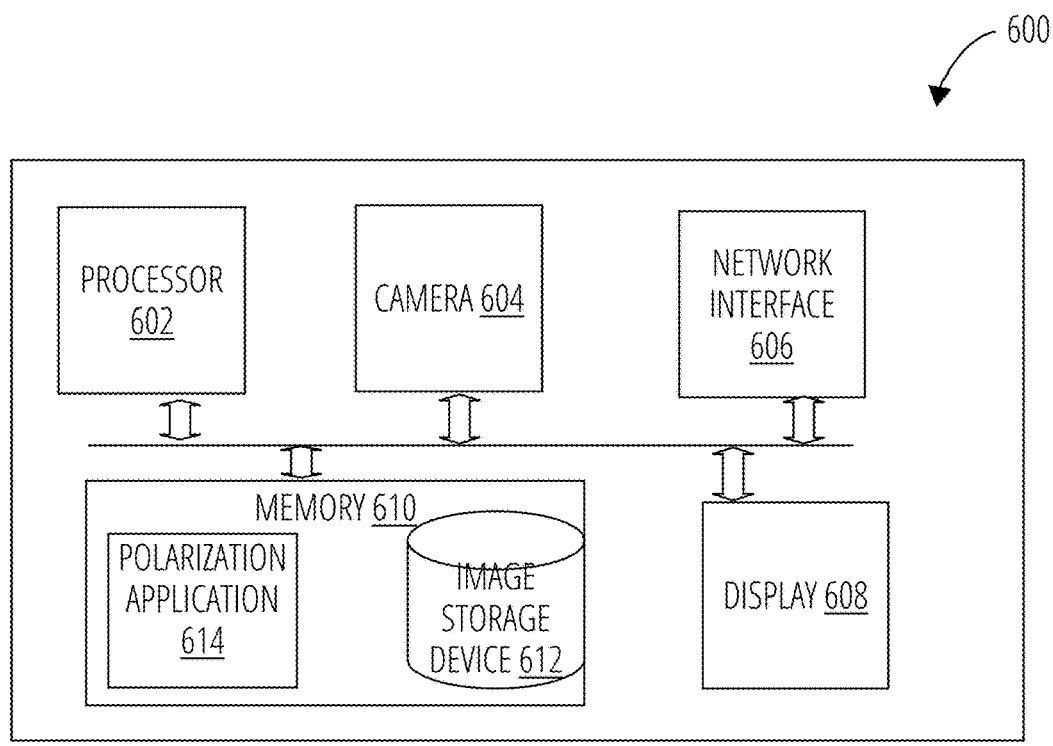
FIG. 6 illustrates components of a computing device that may be used to implement the described polarization microscopy system.

FIG. 6 illustrates components of a computing device 600 that may be used to implement the described polarization microscopy imaging system. It should be understood that other configurations are possible and that the illustrated environment is simply presented as an example. As shown in FIG. 6, a computing device 600 can be used to capture images from its camera 604. The computing device 600 can execute a polarization application 614 that receives a set of images 202 either directly from the camera 604 or from an image storage device 612 on the computing device 600. The computing device 600 can execute the method of polarization microscopy imaging 300.

With reference to FIG. 6, the computing device 600 includes a processor 602, memory 610, and instructions that when executed by the processor 602, direct the computing device 600 to perform operations for a polarization application 614, including method of polarization microscopy imaging 300. The set of images 202 used by the polarization application 614 can be stored in an image storage device 612 of the memory 610 after being captured by camera 604. Computing device 600 includes display 608 and can further include a network interface 606 that enables the computing device 600 to communicate over a network.

Processor 602 can include one or more processors 602 and can be, for example, a central processing unit (CPU), graphics processing unit (GPU) or field programmable gate array (FPGA) that processes data according to instructions of various software programs, including the instructions. Memory 610 can be one or more of any suitable computer-readable storage media including, but not limited to, volatile memory such as random-access memories (RAM, DRAM, SRAM), non-volatile memory such as flash memory, various read-only memories (ROM, PROM, EPROM, EEPROM), phase change memory, magnetic and ferromagnetic/ferroelectric memories (MPRAM, FeRAM), and magnetic and optical storage devices. As used herein, in no case does the memory 610 consist of transitory propagating signals.

Accordingly, the computing device 600 takes the set of images (via the camera 604) and performs the described method of polarization microscopy imaging 300 to output the composite image high resolution image.

Experiments

A standard microscope outfitted with an array of LED light sources and a digital camera containing 2.4 µm pixels to acquire multiple sets of a sequences of images were used. The standard microscope utilized an objective lens (4×, $NA_0 = 0.1$) and a f=100 mm tube lens. The LED array of light sources contained 15×15 surface-mounted elements (center wavelengths: 632 nm, 525 nm and 470 nm per LED color with 4 mm LED pitch). The LED array was positioned 68 mm beneath the sample to create a maximum illumination NA of $NA_i = 0.41$. This led to an effective synthetic NA for our Fourier ptychographic reconstructions of NA of $NA_s = 0.51$, or a 5× improvement in spatial resolution in each lateral dimension. Linear grid polarizing filters, i.e., the first polarizing filter and the second polarizing filter, (polarization wavelength range between 420-700 nm) were inserted directly before the LED array of light sources, the first polarizing filter, and before the camera, the second polarizing filter. Both linear polarizers were installed in rotation mounts with resonant piezoelectric motors (bidirectional accuracy, 0.002°). Sets of images were acquired for four polarization configurations, i.e., four different sets of polarizing filter rotation angles, (i.e., first rotation angle, second rotation angle) for the first polarizing filter (G) and the second polarizing filter (A). These can be described by: (l,m)∈ {G: 0°, A: 0°; G: 90°, A: 90°; G: 45°, A: 0°; G: 45°, A: 90° }

Each set of images 202 also included different illumination angles, i.e., by turning a different LED light source of the array of light sources on and off.

The reconstruction algorithm utilizing the complex matrices were computed on a processor. The generated composite image includes a wide field of view (29 mm$^2$) with a high resolution (1.24 µm two-point resolution).

Validation of Results

Figure 7:
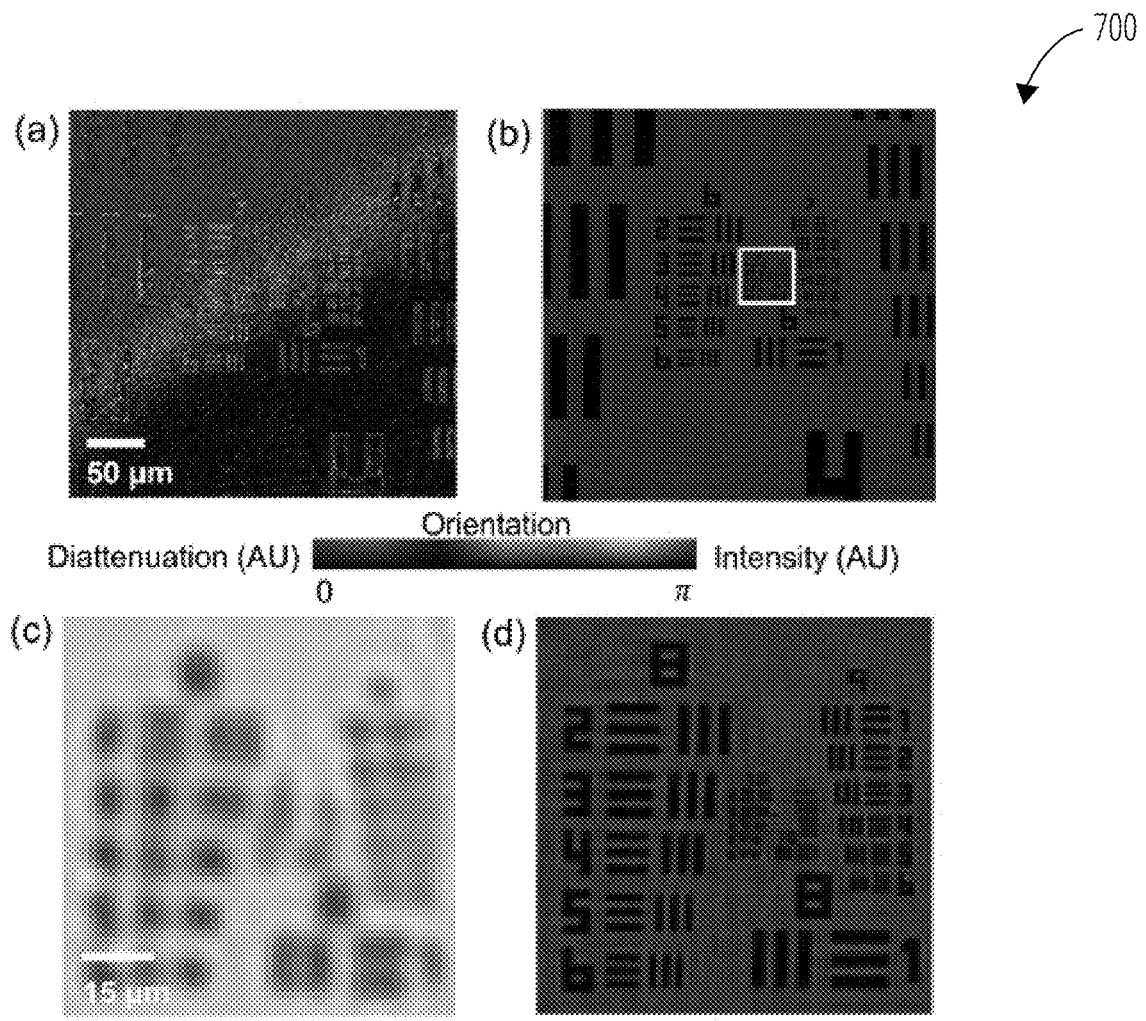
FIG. 7 illustrates images showing verification results of diattenuation estimation accuracy and resolution gain using a resolution target and linear polarizer.

FIG. 7 illustrates a validation of diattenuation and intensity of images utilizing the proposed vectoral Fourier ptychography (vFP) method and a resolution target and linear target.

Referring to FIG. 7, image (a) illustrates the validation of diattenuation and orientation of vFP reconstruction 700, (diattenuation referring to brightness and orientation referring to hue), of vFP reconstruction with a USAF (United States Air Force) target half-covered (in the upper left) by a linear polarizer. Image (b) illustrates an incoherent sum of squared channel amplitudes (brightness) and orientation (hue) of USAF target fully covered by the linear polarizer, rotated by 48 degrees as compared to placement in image (a). Image (c) is a zoomed-in image of the raw image captured under illumination from a center LED light source. Image (d) is a zoomed in image of the vFP reconstruction in image (b) which verifies the resolution gain. The USAF resolution test chart is a widely used resolution target in the imaging field.

To validate that the polarization-dependent metrics of the vFP exhibit the expected resolution enhancement commonly observed with scalar Fourier ptychography (FP), the sample was imaged using a plastic linear polarizer placed above a high-resolution absorptive USAF target. The linear polarizer provides a simple means to create an expected constant orientation and a uniform diattenuation across the regions it covers, while the USAF target provides a standard resolution measure.

The expected resolution gain of a vFP reconstruction follows the same principles as with scalar FP, wherein the smallest resolvable full-pitch resolution (i.e., distance between the center of two similar bars) can be approximated by $$\frac{\lambda}{NA_i + NA_0}.$$

Using red LED illumination (center wavelength 632 nm) in this experiment, a 1.24 µm full-pitch resolution cutoff can be expected after executing the vFP method. Referring to image (b) and image (d), in FIG. 7, this corresponds to a cutoff slightly above USAF target group 9 Element 5. The vFP orientation reconstruction achieves this resolution as shown in FIG. 7 image (d), which provides an appreciable gain over the raw captured FIG. 7 image (c).

The linear polarizer experiment additionally provides a means to assess quantitative diattenuation and orientation measurement accuracy. As only the upper left of the USAF target is covered by the polarizer in FIG. 7 image (a), a diattenuation value closer to 1 within this region, and close to 0 in the lower right, which is uncovered. The mean diattenuation and variance, averaged across a 500$^2$-pixel area within these two respective regions, are $\overline{D}$=0.9822, $\sigma^2_D$=0.001 and $\overline{D}$=0.0693, $\sigma^2_D$=0.011, respectively. It is hypothesized that this experimentally measured diattenuation of less than 1 is due to the use of a plastic linear polarizer, whose transmission at 632 nm is close to 45%, rather than 50%. In addition, the transition boundary between the image area covered and uncovered by linear polarizer exhibits inaccurate values due to angle-dependent shadowing effects introduced by its finite thickness (i.e., the polarizer does not obey the required thin specimen approximation, leading to such artifacts.) Th diattenuation estimates at locations of absorptive USAF bars may also be inaccurate, as the bars are optically opaque.

Validation of Quantitative Orientation Measurement

Figure 8:
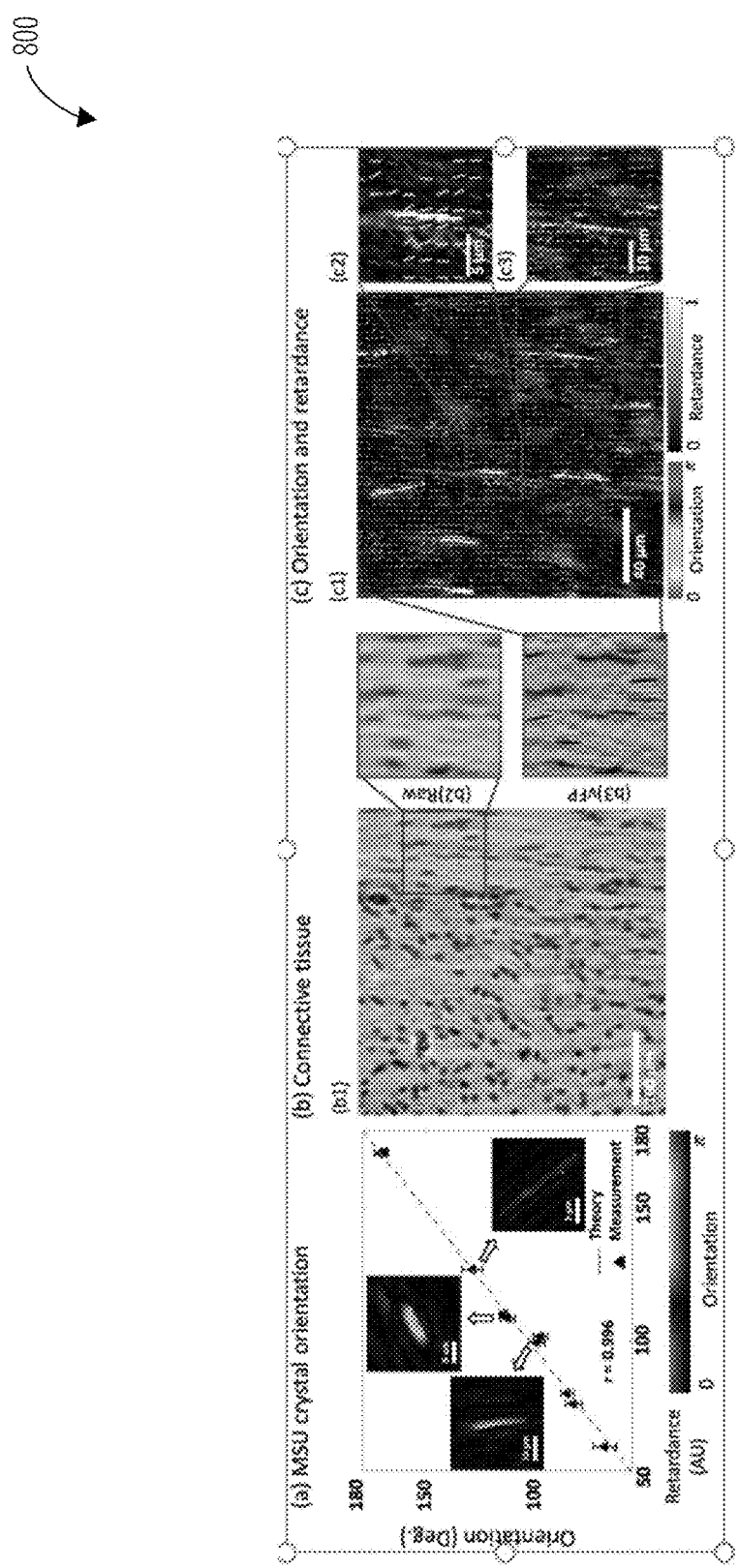
FIG. 8 illustrates images showing verification results or orientation measurement.

FIG. 8 illustrates a validation of orientation measurement 800. FIG. 8 (a) shows that the vFP orientation measurement of monosodium urate (MSU) crystals (y-axis) exhibit expected linear relation with crystal rotation angle (x-axis). Each point reports average and standard deviation (error bar) of per-crystal vFP orientation measurement averaged over pixels within each crystal (examples in three insets, shade is orientation and intensity is retardance). FIG. 8 (b) shows a raw image and vFP reconstruction of human connective tissue specimen. FIG. 8 (b1) illustrates an example of a raw image, FIG. 8 (b2) illustrates zoomed in view of the outlined section in FIG. 8 (b1), and FIG. 8 (b3) illustrates a vFP reconstruction shown as incoherent summation of matrix elements. FIG. 8 (c) shows vFP retardance and orientation of the same area as in FIG. 8 (b2) and FIG. 8 (b3). FIG. 8 (c1) illustrates retardance in grayscale intensity and orientation false-colored, FIG. 8 (c2) and FIG. 8 (c3) illustrate how specimen orientation follows fiber growth direction and exhibits spatial correlations with retardance.

Orientation is a useful polarization quantity used within material and biological specimen analysis. To further investigate the quantitative accuracy of vFP for specimen orientation measurement, a collection of randomly oriented monosodium urate (MSU) crystals were imaged. The MSU crystals are rod-like microstructures whose optical orientation properties are expected to exhibit a linear relationship with crystal rotation angle within the x-y plane. A summary of this experiment's results is presented in FIG. 8 (a). FIG. 8 (a) includes images of three example reconstructed MSU crystals included as insets (shade denotes reconstructed orientation and intensity denotes reconstructed retardance). Plotting the vFP-measured per-crystal orientation versus the expected orientation, as measured from crystal rotation angle within the x-y plane, reveals a clear linear relationship. Measured orientation points were average over all pixels within each crystal, wherein the error bar shows the resulting standard deviation. Ground-truth orientations were computed by fitting a line to each MSU crystal captured within a single Field of view.

In a final experiment to assess vFP's ability to measure orientation, a thin section of human connective tissue (specimen) containing both muscle and collagen shown is FIGS. 8 (b) and (c). In this type of tissue specimen, it is common to observe polarization-dependent effects due in part to the response of collagen fiber. To improve visualization, orientation is overlaid as an undirected vector field on top of the retardance shown in grayscale in FIG. 8 (c) to reveal a spatial correlation between retardance and orientation. Reconstructed orientation vector alignment is consistent with fiber growth direction within the connective tissue. The Field of view in FIG. 8 (c1) matches that of the example raw image is shown in FIG. 8 (b2) and the zoom of the vFP reconstruction in FIG. 8 (b3).

Validation of Retardance and Phase

Figure 9:
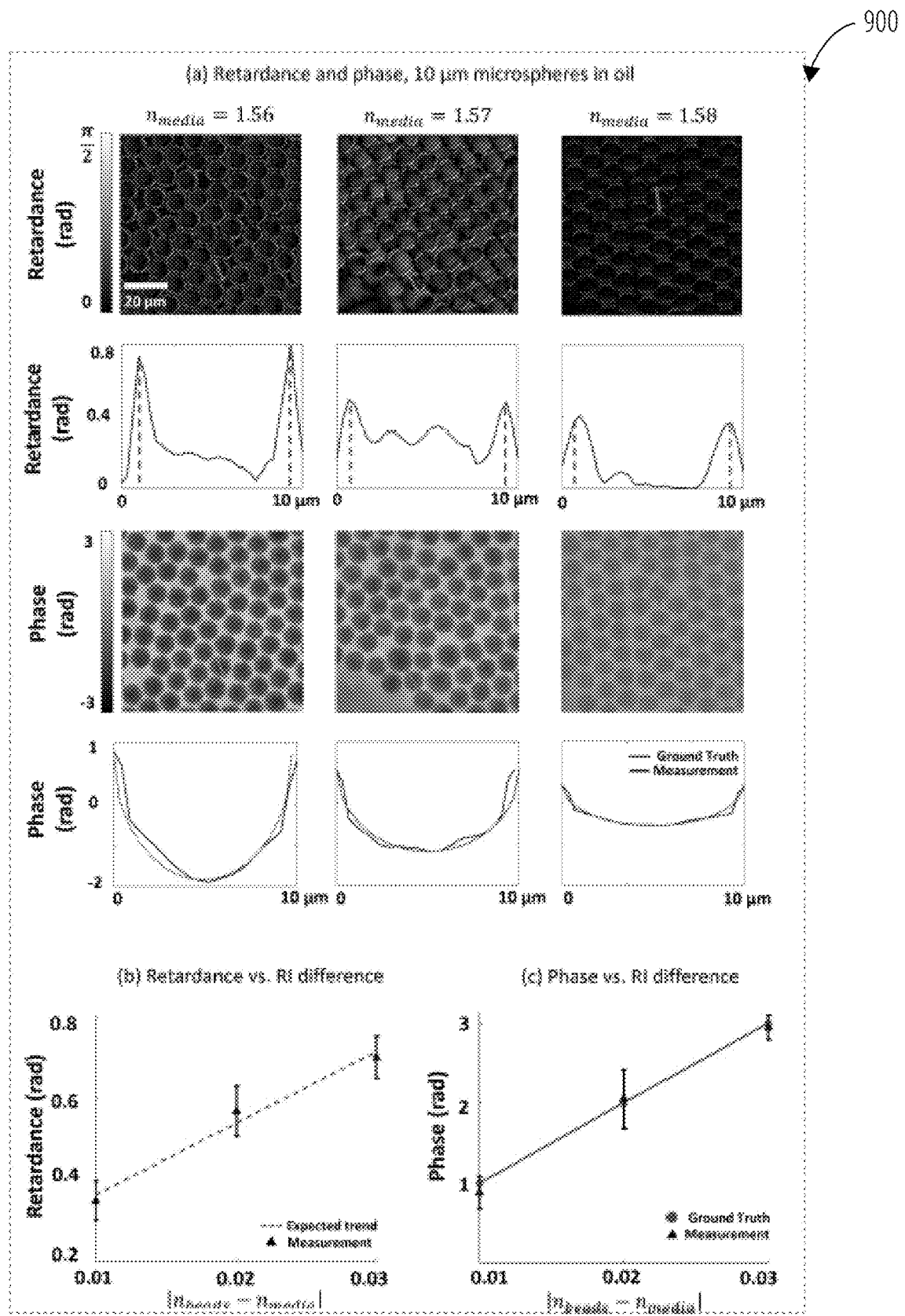
FIG. 9 illustrates images and plots to present results from vFP retardance and phase validation experiments.

FIG. 9 illustrates the vFP retardance and phase validation 900 results. FIG. 9 (a) shows the retardance of images (first row) and retardance profiles (second row) from reconstructions of 10-μm monodisperse polystyrene microspheres immersed in oils with refractive indices (RIs) of 1.56, 1.57, and 1.58. The third and fourth rows of FIG. 9 show the phase. Profiles through select beads show RI-dependent retardance shift at bead-oil boundary measured with dotted line, while phase profiles closely match ground truth shift. FIG. 9 (b) show graphs of a reconstructed maximum retardance shift (dotted line in (a), average of 20 beads per point) follows expected linear trend with RI difference between microspheres and oil. FIG. 9 (c) illustrates in a plot the reconstructed maximum phase shift follows ground truth (average of 20 beads per point).

To validate vFP's ability to measure specimen retardance, the findings of a recent study that demonstrated a linear relationship between retardance and refractive index (RI) were followed. Though microspheres do not intrinsically exhibit birefringence, a sharp RI transition at their boundary will lead to a measurable retardance shift that is linearly proportional to the RI difference at the transition boundary. To explore this connection, three specimens were prepared of oil-immersed polystyrene microspheres with oils of three different RI to generate three unique RI transition differences. Images of vFP-reconstructed retardance are shown in FIG. 9 (a) in the top row, from which a clear peak of retardance that consistently exists at the bead profile edge (i.e., forms a ring around each bead). Profiles of randomly selected beads below confirm such peak formation, from which the maximum per-bead retardance shift (red dashed line) are measured. Plotting the average maximum retardance shift (20 beads per point) as a function of RI difference in FIG. 9 (b) confirms the previously observed linear trend. Through this experimental analysis, it was confirmed that the quantitative accuracy of vFP reconstructed phase values, as shown at in the fourth row of FIG. 9 (a) and summarized in plot of average maximum phase shift versus RI difference in FIG. 9 (c).

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of microscopy imaging, the method comprising:
    illuminating, by a light source, a sample positioned in a target area of a lens, wherein the light source is one light source in an array of light sources positioned to provide light to the target area;
    acquiring a set of images by an image sensor of the illuminated sample, the image sensor having a field of view;
    performing a reconstruction algorithm on the set of images to generate a composite high-resolution image over the field of view of the image sensor; and
    modeling polarimetric properties of the sample utilizing the acquired set of images or the composite high-resolution image, wherein the modeling uses Jones calculus to represent an optical field as a complex matrix containing two orthogonal components defined along an x and y axes.

2. The method of claim 1, wherein the reconstruction algorithm is a phase retrieval algorithm to recover polarization information of the set of images iteratively at each resolved pixel of each image from a set of images.

3. The method of claim 1, wherein the modeling utilizes the acquired set of images as a sample matrix.

4. The method of claim 3, further comprising modeling polarization aberrations utilizing the acquired set of images as a pupil matrix.

5. The method of claim 4, wherein the reconstruction algorithm utilizes the sample matrix and the pupil matrix.

6. The method of claim 4, further comprising removing polarized light aberrations from the composite high-resolution image utilizing the pupil matrix.

7. The method of claim 1, wherein the modeling utilizes the composite high-resolution image.

8. The method of claim 7, wherein the polarimetric properties includes one or more of sample retardance, sample orientation, and sample diattenuation.

9. The method of claim 1,
    wherein the array of light sources is a planar array of light sources, each light source of the planar array of light sources providing light from a different direction to the target area,
    wherein the image sensor is positioned to capture an image of a sample positioned in a target area,
    wherein a first polarizing filter is positioned between the target area and the planar array of light sources,
    wherein the first polarizing filter is positioned at a first rotation angle,
    wherein a second polarizing filter is positioned between the lens and the image sensor,
    wherein the second polarizing filter is positioned at a second rotation angle, and
    wherein the lens is disposed in a light path between the planar array of light sources and the image sensor.

10. The method of claim 1, wherein the reconstruction algorithm utilizes the modeled polarimetric properties of the sample to generate the composite high-resolution image with minimal polarized light aberrations.

11. The method of claim 1, wherein the polarimetric properties comprise polarization properties and polarization aberrations, wherein the modeling applies Jones calculus to the acquired set of images to describe the polarization properties of the sample as a sample matrix and to describe the polarization aberrations of the sample as a pupil matrix.

12. The method of claim 1, wherein light's polarization state is defined by an amplitude of the two orthogonal components.

13. A computing device, comprising:
    a processor, memory and instructions stored in the memory that when executed by the processor, direct the computing device to:
    receive a set of images;
    generate a composite high-resolution image by:
        acquiring a set of images by an image sensor of an illuminated sample positioned in a target area of a lens, the image sensor having a field of view;

performing a reconstruction algorithm on the set of images to generate a composite high-resolution image over the field of view of the image sensor;

outputting the composite high-resolution image for display; and modeling polarimetric properties of the sample utilizing the acquired set of images or the composite high-resolution image, wherein the modeling uses Jones calculus to represent an optical field as a complex matrix containing two orthogonal components defined along an x and y axes.

14. The computing device of claim 13, further comprising a camera that captures the set of images.

15. The computing device of claim 13, wherein the instructions to generate the composite high-resolution image direct the processor to:

model polarization properties of the illuminated sample utilizing the acquired set of images by a sample matrix;

model polarization aberrations utilizing the acquired set of images by a pupil matrix; and perform the reconstruction algorithm utilizing the sample matrix and the pupil matrix.

16. The computing device of claim 15, wherein the reconstruction algorithm is a phase retrieval algorithm.

17. A method of microscopy imaging, the method comprising:

illuminating, by a light source, a sample positioned in a target area of a lens, wherein the light source is one light source in an array of light sources positioned to provide light to the target area;

acquiring a set of images by an image sensor of the illuminated sample, the image sensor having a field of view;

performing a reconstruction algorithm on the set of images to generate a composite high-resolution image over the field of view of the image sensor; and modeling polarimetric properties of the sample utilizing the acquired set of images or the composite high-resolution image, wherein the modeling utilizes the acquired set of images as a sample matrix; and modeling polarization aberrations utilizing the acquired set of images as a pupil matrix.

* * * * *